United States Patent
Dastidar et al.

(10) Patent No.: US 11,995,021 B2
(45) Date of Patent: May 28, 2024

(54) ZONED ACCELERATOR EMBEDDED PROCESSING

(71) Applicant: XILINX, INC., San Jose, CA (US)

(72) Inventors: Jaideep Dastidar, San Jose, CA (US); David James Riddoch, Cambridgeshire (GB); Steven Leslie Pope, Cambridge (GB)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/574,342

(22) Filed: Jan. 12, 2022

(65) Prior Publication Data

US 2023/0222082 A1 Jul. 13, 2023

(51) Int. Cl.
*G06F 13/42* (2006.01)
*G06F 13/16* (2006.01)

(52) U.S. Cl.
CPC ...... *G06F 13/4265* (2013.01); *G06F 13/1684* (2013.01)

(58) Field of Classification Search
CPC .......................... G06F 13/1684; G06F 13/4265
See application file for complete search history.

(56) References Cited

U.S. PATENT DOCUMENTS

| 10,673,439 | B1 | 6/2020 | Ahmad et al. | |
| 10,698,842 | B1 | 6/2020 | Dastidar et al. | |
| 11,063,594 | B1 | 7/2021 | Ahmad et al. | |
| 11,113,194 | B2 | 9/2021 | Dastidar et al. | |
| 2019/0220601 | A1 | 7/2019 | Sood et al. | |
| 2020/0320017 | A1 | 10/2020 | Lakshman et al. | |
| 2022/0269638 | A1* | 8/2022 | Dastidar | G06F 21/602 |
| 2022/0414028 | A1* | 12/2022 | Pope | G11C 7/1096 |

* cited by examiner

*Primary Examiner* — Brian T Misiura
(74) *Attorney, Agent, or Firm* — Patterson + Sheridan, LLP (57) ABSTRACT

Embodiments herein describe end-to-end bindings to create zones that extend between different components in a SoC, such as an I/O gateway, a processor subsystem, a NoC, storage and data accelerators, programmable logic, etc. Each zone can be assigned to a different domain that is controlled by a tenant such as an external host, or software executing on that host. Embodiments herein create end-to-end bindings between acceleration engines, I/O gateways, and embedded cores in SoCs. Instead of these components being treated as disparate monolithic components, the bindings divide up the hardware and memory resources across components that make up the SoC, into different zones. Those zones in turn can have unique bindings to multiple tenants. The bindings can be configured in bridges between components to divide resources into the zones to enable tenants of those zones to have dedicated available resources that are secure from the other tenants.

22 Claims, 4 Drawing Sheets

ZONED ACCELERATOR EMBEDDED PROCESSING

TECHNICAL FIELD

Examples of the present disclosure generally relate to end-to-end zoning of hardware resources in a system on a chip (SoC).

BACKGROUND

Current acceleration devices such as Smart network interface cards/controllers (SmartNICs) include different components such as I/O gateways, processor subsystems, network on chips (NoCs), storage and data accelerators, data processing engines, and programmable logic (PL). In prior techniques, these different components in the acceleration devices are treated as separate monolithic components that simply pass work or transform data before forwarding on to the next component. At best, these components either interface with each other over a common bus protocol such as Advanced eXtensible Interface (AXI), or have a protocol bridging function that converts one component's protocol, such as PCIe, onto another component's protocol, such as AXI.

When transmitting data from one component to the next, properties or attributes of the data unique to one component, or unique to a tenant in service of a function for that tenant, are not propagated on to the next component such that the two components are opaque to each other even though both components may be performing specific functions in service of the same tenant, Stated differently, the different components in the same accelerator device act independently of each other even though they may perform interrelated operations. Some existing techniques involve software intervention (e.g., a hypervisor or component firmware) to regain attributes unique to a tenant across various components (although the bridge may create an opaque boundary) such that the receiving component can re-acquire a tenant's properties through that intervening software every time one component receives work or data from another component. However, this software intervention creates overhead, particularly when it comes to enabling services across components for multiple tenant functions. Furthermore, some tenants do not trust hypervisors or other software entities intervening (as is the case in bare-metal deployments) on their behalf.

SUMMARY

One example is a system on a chip (SoC) that includes an I/O gateway configured to couple to an external host and a processor subsystem connected to the I/O gateway that includes processing cores and an interconnect communicatively coupling the processing cores. Moreover, circuitry in the I/O gateway, the processing cores, and the interconnect is divided into a plurality of zones with end-to-end bindings so that each of the plurality of zones is isolated from each other where the circuitry in the I/O gateway is configured to extract the end-to-end bindings.

One example described herein is a smart network interface controller (SmartNIC) that includes an I/O gateway configured to couple to an external host and a processor subsystem connected to the I/O gateway that includes processing cores and an interconnect communicatively coupling the processing cores. Moreover, circuitry in the I/O gateway, the processing cores, and the interconnect is divided into a plurality of zones with end-to-end bindings so that each of the plurality of zones is isolated from each other where the circuitry in the I/O gateway is configured to extract the end-to-end bindings One example described herein is a method that includes receiving, at a SoC, an encrypted packet assigned to first zone of a plurality of zones in the SoC, decrypting the encrypted packet, extracting, at an I/O gateway in the SoC, end-to-end bindings from the decrypted packet, adding, at the I/O gateway, stashing attributes to a transaction corresponding to the decrypted packet based on the end-to-end bindings, routing, in an interconnect in the SoC, the transaction based on the stashing attributes to a first processing core in the SoC assigned to the first zone, and processing the transaction at the first processing core.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe end-to-end bindings to create domains that begin from the Hosts and then extend between different components in a SoC, such as an I/O gateway, a processor subsystem, a NoC, storage and data accelerators, and PL. That is, the hardware in the SoC is divided into multiple zones, where each zone can be assigned to a different domain that is controlled by a tenant such as an external host, or software executing on that host (e.g., a virtual machine, operating system, or a software application). That is, a domain includes an external agent such as an external host, or software executing on the host as well as one of the zones in a SoC. Embodiments herein create end-to-end bindings between an external agent and acceleration engines, I/O gateways, and embedded cores in acceleration devices such as SmartNICs to create a domain. Instead of the components in the SoC being treated as disparate monolithic components, the bindings divide up the hardware and memory resources across components that make up the acceleration device, into different zones, Those zones in turn can have unique bindings to respective external agents (e.g., tenants) to form a domain. The bindings can be configured in bridges between components in the SoC, such as a processor subsystem bridge, to divide resources into the zones to enable tenants of those zones to have dedicated available resources that are secure from the other external agents which are assigned to different zones in the SoC. Access to these zones can be controlled using a programmable table in the bridge so that the bindings can propagate from an I/O gateway to the processor subsystem, and then to the remaining components in the acceleration device (e.g., an input/output memory management unit (IOMMU), processing cores, caches including directed cache injection, a NoC, and the memory destinations of the NoC). The end-to-end bindings described herein are generally applicable to a diverse set of storage, networking, artificial intelligence (AI) and other acceleration devices.

Figure 1:
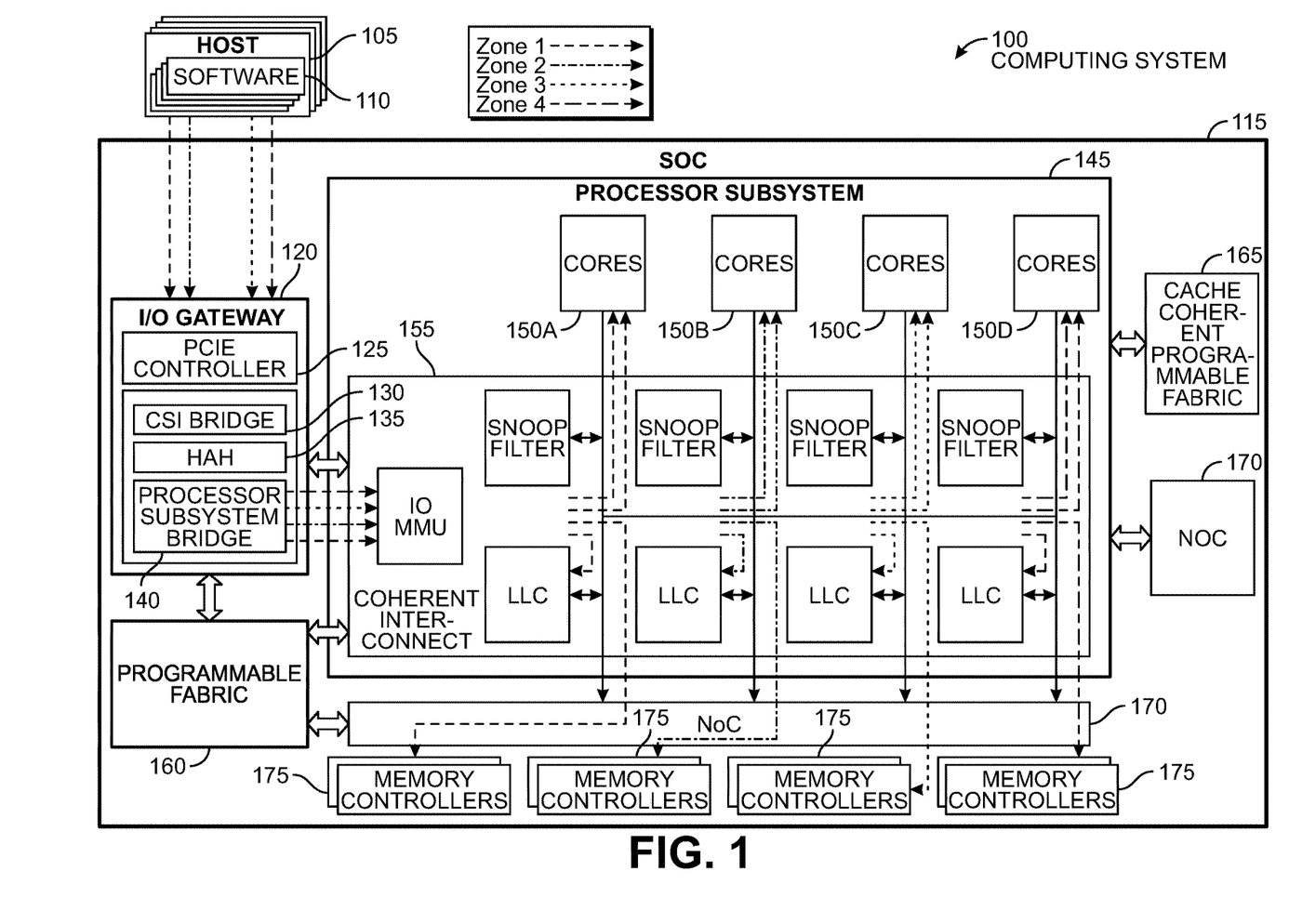
FIG. 1 is a SoC with zones with end-to-end bindings, according to an example.

FIG. 1 is a computing system 100 including a SoC 115 with zones with end-to-end bindings, according to an example. The computing system 100 includes multiple hosts 105 coupled to the SoC 115 (e.g., an integrated circuit). The hosts 105 (e.g., servers) can include processor(s) and memory that execute software 110. The software 110 can include one or more virtual machines (VMs), operating systems (OSs), or software applications (e.g., user or tenant applications). The host 105 can offload tasks to the SoC 115. For example, the SoC 115 may be a SmartNIC with accelerator engines, or can be an accelerator device such as an AI accelerator, cryptography accelerator, compression accelerator, graphics accelerator, and the like.

Embodiments herein describe an end-to-end setup, with either a pre-boot configuration option and/or a driver configuration option to program multiple components in the SoC 115 across external agents, such that a collection of resources across these components form a zone. These zones can then offer performance and/or isolation between them, whether it is security isolation from other tenants using the SoC 115, performance isolation from other tenants, and/or error isolation from erroneous or malicious tenants. The isolation zones are created through binding between these components, functions within the components, with various protocol or component attributes used to create or signal the binding association with a particular zone. The configuration and binding setup described in this section can achieve zoned isolation without the overhead of an intervening hypervisor, especially during run-time, or for non-hypervisor bare-metal deployments. For example, software running in the embedded processor subsystem of the SoC cannot access the hardware bus PCIe protocol's attributes that have the binding attributes (which are discussed below). The only information from the PCIe Protocol that is typically exposed to the processor subsystem is the read and write data, which means providing the binding attributes to the software in the processor subsystem would include encapsulating the entirety of the PCIe packet and forwarding it to the subsystem. A hardware solution, however, avoids this overhead completely.

In one embodiment, each domain (i.e., the combination of an external agent and a zone in the SoC 115) provides isolation and resources for each host 105, for each bare-metal OS in the host 105, each VM in the host 105, each application in the host 105, or each External PCIe Accelerator Card interacting with its corresponding zone in the SoC 115. While FIG. 1 illustrates an example transaction flow across four zones, the concept applied for these can be applied equally either to create a single zone, or more than four zones, using the same binding techniques described herein. In addition, while FIG. 1 illustrates an example transaction flow in one direction, namely software 110 in the host 105, to I/O gateway 120, to processor subsystem 145, to NoC 170, and to memory controllers 175, the concept applied for these can be applied equally for transaction flow in a different direction or across different agents, for example from the cores 150, to the interconnect 155, to the I/O gateway 120, and to the hosts 105. Further, the concept can be used for intra-SoC communication such as from the cores 150, to the interconnect 155, to the programmable fabric 160, or accelerators (not shown) in the SoC 115.

The following discussion provides a four domain example, using FIG. 1, and describes the different components that are either configured, have the capability to interpret binding attributes, or programmed with binding attributes in order to create four domains. The following list also describes the transaction flow and identification mechanisms to distinguish transactions between one domain and another.

In one embodiment, there are four external agents that each have a binding to the four zones shown in FIG. 1. The binding between the external agents and the zones creates four domains. Examples of the external agents that can be bound to these zones include (i) four server hosts 105, (ii) four VMs or four OSs in a host 105, (iii) four user/tenant applications executing in a host 105, or (iv) four PCI peer devices or four peer accelerators (not shown). These examples can all serve as external agents for the four zones illustrated in FIG. 1.

The external agents (e.g., hosts 105, VMs, OSs, user/tenant applications, or peer devices) can initiate transactions that are routed to the I/O gateway 120. The I/O gateway 120 serves as a PCIe, Compute Express Link™ (CXL™), or Cache Coherent Interconnect for Accelerators (CCIX) external communication gateway to the internal components in the SoC 115 such as the processor subsystem 145 and a programmable fabric 160 which contains PL.

The communication between the host 105 and the I/O gateway 120 is shown using four arrows, where each arrow represents the transactions associated with a different domain. In some examples, these transactions can be PCIe or CXL transactions. The transactions issued by the external agent contain binding attributes which are used to identify the domain to which the transactions belong. These binding attributes will be discussed later in the subsequent figures.

In one embodiment, bindings can be created between the four domains and four unique encrypted PCIe traffic streams. A first option is to prevent any of the domains from having access to the keys and properties for PCIe Integrity and Data Encryption (IDE) traffic. For this option, a PCIe IDE Transaction Layer Packet (TLP) Prefix may contain attributes for a Link IDE Stream to create the binding.

A second option is to have a binding between Selective IDE Streams and domains such that access to the keys and properties for PCIe IDE encrypted traffic is constrained to the Selective IDE Streams with binding for those domains. For the four domain example in FIG. 1, assuming that the PCIe controller 125 supports 32 Selective IDE Streams, there can either be a 1:1 binding to a total of four Selective IDE Streams or a 4:1 binding between 32 Selective IDE Streams and the four domains. For this option, the PCIe IDE attributes in the TLP Prefix portion of a PCIe packet received from the host 105, contains the binding attributes identifying the Selective IDE Streams.

A third option, which can be applied in addition to or alternatively of the second option, is to form a binding between the four domains and Requester ID (RID) attributes in the transactions such that access to the keys and properties for PCIe IDE encrypted traffic is constrained not only to the Selective IDE Streams with binding for a particular domain, but also to a particular Bus:Device.Function (BDF) value or set of BDF values, or a set of Function Numbers. For the four domain example in FIG. 1, assuming the PCIe Controller 125 is a Gen5 x16 PCIe controller that supports 32 Selective IDE Streams and also 32 Physical Functions (PFs), there can be a 1:1 binding between four PFs and the four domains or a 4:1 binding between 32 PFs and the four domains. In the third option, the PCIe Requester ID, which can be in the header portion of the PCIe packets received from the host 105, contains the binding attributes identifying the PFs. The 32 PFs in turn, can have a 1:1 binding with the 32 Selective IDE Streams, independent of the PF to domain binding.

A composable scalable interconnect (CSI) bridge 130 then receives the PCIe IDE decrypted packets from the PCIe controller 125. The CSI bridge 130 uses a collection of PCIe packet attributes along with CSI attributes to extract domain-specific properties based on pre-configured bindings in the CSI Bridge 130 for subsequently determining the domain or zone. The CSI bridge 130 also makes a determination, in part based on a match with the CSI attributes, whether the PCIe transaction (plus its metadata) should be routed to a host access handler (HAH) 135 or whether the transaction can skip the HAH 135 and go directly to a processor subsystem bridge 140.

In one embodiment, the CSI bridge 130 extracts the source property for binding with a zone in the SoC. The source property could be any one, or multiple attributes of the external agent connection. The CSI bridge 130 identifies the source of the PCI packets using the source property and binds the data received from that source to its corresponding zone, in the situation where the transactions for the four domains are received at multiple PCIe controllers 125, the CSI_ID is one such source property, communicating the PCIe controller connection. This includes the case where the transactions are received from four hosts 105, and the case where the transactions are received from four distinct PCIe Peer/Accelerator Sources. Thus, the CSI_ID or a PCIe controller number is one criterion for extracting the source property binding with a Domain: <PCIe Controller #>.

Alternatively, as other examples of source properties, where the transactions for the four domains are received at a single PCIe controller 125, the transactions can represent four distinct Requester ID (BDF) sources, four function numbers, or four Requester ID Groups (e.g. PFs plus their associated virtual functions (VFs)) for extracting the source property binding with a Domain: <BDF>, A unique combination of <PCIe Controller #, BDF> can also form the criteria for extracting the source property binding assigned to a domain. A multi-core host, different cores, or different applications communicatively coupled to a PCIe device can express the source property through transmitting unique BDF values in the PCIe TLP. Thus, the BDF value can be chosen as a binding property for the Host's Core, VM, or Application that is the external agent for a domain.

After extracting the source property of the domain, the CSI bridge 130 extracts a destination property for binding with the corresponding zone in the SoC. In one embodiment, the destination property is a routing attribute such as destination address, or a particular range of destination addresses such as a PCIe BAR mapped memory. For addressless transactions, for example PCIe Vendor Defined Messages (VDMs), the destination property can also be the destination BDF or a range of BDFs, or multiple Functions with a common Bus #:Device #.

Using the destination property, the CSI bridge 130 binds the destination of the PCIe packet to the same domain as the source. Based on an address of the requesting TLP in the header portion of the received PCIe packet, the CSI Bridge 130 can determine a destination function for that domain or zone, based on the destination PCIe base address register (BAR) for that function, and then the programmed aperture (e.g., a portion of the BAR that corresponds to a destination function) within the memory space of that PCIe BAR where the source address matches <Function #, PCIe BAR #, Aperture> or <BDF, PCIe BAR #, Aperture>. Examples of the destination function can be a particular acceleration function, e.g., cryptographic or artificial intelligence functions. For example, one tenant can use the crypto acceleration function in the SoC whereas another tenant uses a machine learning acceleration function in the SoC but in a different zone. The destination function can also be a specific chain of acceleration functions. In that case, one tenant first uses the crypto acceleration function followed by then using the decompression acceleration function in the SoC, whereas another tenant first uses a decompression acceleration function followed by using the machine learning acceleration function.

Instead of identifying which aperture in the BAR the incoming address fell in, the destination function for a domain/zone can alternatively be based on a source address offset match with address offsets within the aperture associated with certain functions. A unique combination of <PCIe Controller #, BDF, PCIe BAR, Aperture, Offset> can also form the criteria for extracting the source property binding with a zone along with different offsets identifying different zones or different functions for the same zone.

In addition to using the PCIe BAR and/or the source address offset match, a process address space ID (PASID) in the TLP prefix of a received PCIe packet can determine the destination function for a zone where different PASID values identify different zones or different functions for the same zone.

In one embodiment, the binding attributes can be further discerned by the HAH 135. The HAH 135 can receive <PCIe Controller #, BDF, PCIe BAR, Aperture, Offset> binding properties from the CSI bridge 130 in original or encoded form, or some relevant subset of the binding properties, along with the PCIe packet. For example, if the Address Offset was not a binding property for the CSI Bridge 130, but is a binding property for the HAH 135, then the CSI bridge 130 propagates the set of attributes to the HAH 135 which the HAH 135 uses for further binding to a specific zone, or alternatively, further binding to a specific function (e.g., a specific storage cryptographic function) to be performed for a zone that was already identified by the CSI bridge 130. The HAH 135 can then use additional PCIe packet attributes, and along with the attributes propagated by the CSI bridge 130, to further extract zone specific properties based on pre-configured bindings in the HAH 135 to subsequently identify the zone, if the specific zone or function within the zone has not already been identified by earlier steps.

These earlier steps can include, based on the requesting TLP's address offset within the targeted aperture, the HAH 135 determining the specific service the external agent wishes to access, as well as the specific zone within the SoC 115 that the External Agent has a binding to. Or the HAH 135 can also use transaction processing hints (TPH) in the TLP Prefix portion of a received PCIe Packet to determine the specific zone within the SoC 115 that the external agent has a binding to. When the TPH is used for binding, there may be a restriction such that only unique TPH values can be sourced, and aliasing is not permitted, even though different sources have the full TPH namespace available to them. In that case, the TPH is uniquely provisioned across the four host 105, four VMs/OS, four user/tenant applications, or the four PCIe peer devices/accelerators such that the same TPH value cannot be issued by more than one external agent.

These earlier steps can also include an embodiment where the Requester ID, which is part of the PCIe Header, and the CSI_ID in combination are associated with a zone in the SoC. A certain set of Requester ID plus CSI_ID combinations can be further reduced to a smaller set of Extended Multi-Tenant ID (XMTI) binding attributes. White the HAH 135 itself may not use the XMTI binding attributes, components further downstream in the SoC 115 may use the XMTI binding attributes to achieve Isolation and Access Control.

The processor subsystem bridge 140 can receive the transactions from the HAH 135 or directly from the CSI bridge 130 and can add routing and stashing attributes before propagating the transaction to the processor subsystem 145. In one embodiment, the processor subsystem bridge 140 uses the TPH to reference a programmable lookup table or indexed table to acquire further zone binding attributes to include with transactions that are routed from I/O gateway 120 to the coherent interconnect 155 in the processor subsystem 145. This programmable table can be programmed such that each TPH value can indicate a particular set of cache injection (e.g., stashing) attributes, such as a Stash Node ID (StashNID) and Logical Processor ID (StashLPID), which can uniquely identify the stash destination within the processor subsystem 145. Transactions to certain processor subsystem destined apertures may not be enabled to have stashing attributes and command types (e.g., transactions mapped to a first memory controller 175 may be enabled to have stashing while transactions mapped to a second memory controller 175 do not), or alternatively, certain TPH values may have lookup results where the stashing attributes indicate no stash attributes need to be added before forwarding to the processor subsystem 145.

FIG. 1 illustrates forwarding the four transactions from the I/O gateway 120 to the coherent interconnect 155. These transactions may optionally flow through the IOMMU for access control checks to the local processor subsystem 145, or to perform address translation from the external BAR Mapped PCIe addresses to the address map of the processor subsystem 145, Further, address map considerations can be taken into account to populate page tables accessed by the IOMMU, and the address map of the processor subsystem 145. As shown, circuitry in the coherent interconnect 155 is assigned to the four zones, such as the snoop filters and Last Level Cache (LLC) to provide isolation as the transactions flow through the interconnect 155.

In the case where the external agents are four hosts 105, the host initiated MMIO transactions that are address based, may have already undergone a host MMU to PCIe address space translation. When arriving at the I/O gateway 120, the requesting address that matches the BAR Mapped Memory in PCIe Physical Address Space is the property used to direct the MMIO Transaction to the processor subsystem 145. Thus, the page table translation that occurs in the IOMMU performs a translation from PCIe address space to the processor subsystem's physical address space, as opposed to translating from the typical processor subsystem's virtual address space to physical address space. The processor subsystem's physical address space in turn may be a function of the SoC's DDR and peripheral physical Address map provided via the device tree to the boot CPU (e.g., one of the cores 150), although the stashing address being in coherent address space can be restricted to main memory (DDR or on-chip memory (OCM)).

Similar considerations can apply when the external agents are four external PCIe peer devices or accelerators that initiate transactions using PCIe Physical address space with the intervening PCIe Switch having BAR Mapped Memory directing it to the SoC 115 with the I/O gateway 120 serving as a PCIe gateway.

After flowing through the IOMMU, the coherent interconnect 155 routes the transactions to one of four processor zones. That is, resources in the processor subsystem 145 can be divided into the four zones. If the stashing attributes are enabled, the interconnect 155 can route the transactions to finer grained destinations within each of the four processor zones.

The transactions can be routed to processing zones defined by processing cores 150 which, in this example, are divided into four clusters: cores 150A in a first processor zone, cores 150B in a second processor zone, cores 150C in a third processor zone, and cores 150D in a fourth processor zone. The data portion of the transactions forwarded to the cores 150 contains the metadata which is used in downstream communications.

If the stashing attributes StashNID and StashLPID indicate the stashing destination of a particular L2 cache in one of the cores 150 (and assuming each processor zone has a duster of four cores 150) then the stash can target one of four L2s per processor zone for a total of 16 L2 stash destinations. In one embodiment, this offers the lowest possible access latency for cache injected data associated with the transaction issued by the external agent or cache injected data plus the metadata associated with the transactions after they have been received from the I/O gateway 120.

If the stashing attributes StashNID and StashLPID indicate the stashing destination of a particular L3 Cache (again assuming each processor zone has a cluster of four cores 150) then the stash can target a L3 stash destination in each of the four processor zones. If the L2 stash operation was not accepted, the L3 cache for that zone may allocate the L2 stash operation's data instead, offering the next best access latency for cache injected data.

If a write stash operation fails to allocate in the targeted stash destination in its zone, the LLC for that zone can attempt to allocate the write in its cache instead. In one embodiment, the coherent interconnect 155 includes four LLC slices, along with their four associated home nodes. Each home node is then mapped to a pair of memory controllers 175 such that the stashed writes to the four zones that fail to allocate in either their zone's four L2 caches or the L3 cache, then attempt to allocate in the corresponding LLC slice. However, if no cache injection or allocation is possible, the write operation completes in the zone's DDR memory destination using the memory controllers 175.

At a system level, for the pairwise relationship between external domains and processor zones running on the four clusters of the cores 150 to integrate to form a single domain, in one embodiment, the set of external agents (e.g., hosts 105, software 110, or PCIe-Accelerator domains) that initiate the four transactions have a corresponding set of four SoC zones, with software drivers, applications, or OSes with multiple applications running on each of the four embedded processing zones executing on the clusters of cores 150. Moreover, the software communicating between the external domains and the four embedded processing zones running on the cores 150 can consider during their setup, address space translations, and therefore the binding from the source address domain to the destination address domain, including the intermediate address domains, as the transactions flow through different address domains in the SoC. For example, the software can handle address space transitions from the four host domains' virtual address spaces to the four host domains' physical address spaces, transitions from the four host domains' physical address spaces to either the four domains' PCIe address space for the multi-host case, or one of the four domains' common PCIe address space for the single-host case, and transitions from the four domains' PCIe address space to the processor subsystem zone physical address space.

In one embodiment, the communication of the transactions from the host 105 to the CSI bridge 130 allow for PCIe IDE encrypted data communication per domain. However, forwarding the transactions from the CSI bridge 130 to the processor subsystem 145 can include de-crypted data. Should there be a desire for either security or isolation between the transactions downstream of the CSI bridge 130, then a common encryption cipher such as Advanced Encryption Standard (AES) can be used between the I/O gateway 120 and the cores 150 by enabling a crypto extension in the cores 150.

Further, while the relationship described above was a pairwise relationship between the external agents and embedded processing zones running on the cores 150, the four domains are not restricted to a pairwise relationship and can extend to other components in the system, including partitioning the programmable fabric into four PI zones and four accelerator zones such that cores 150, the L2 caches, and the L3 caches are communication peers with the four PL zones and the four accelerator zones.

Figure 2:
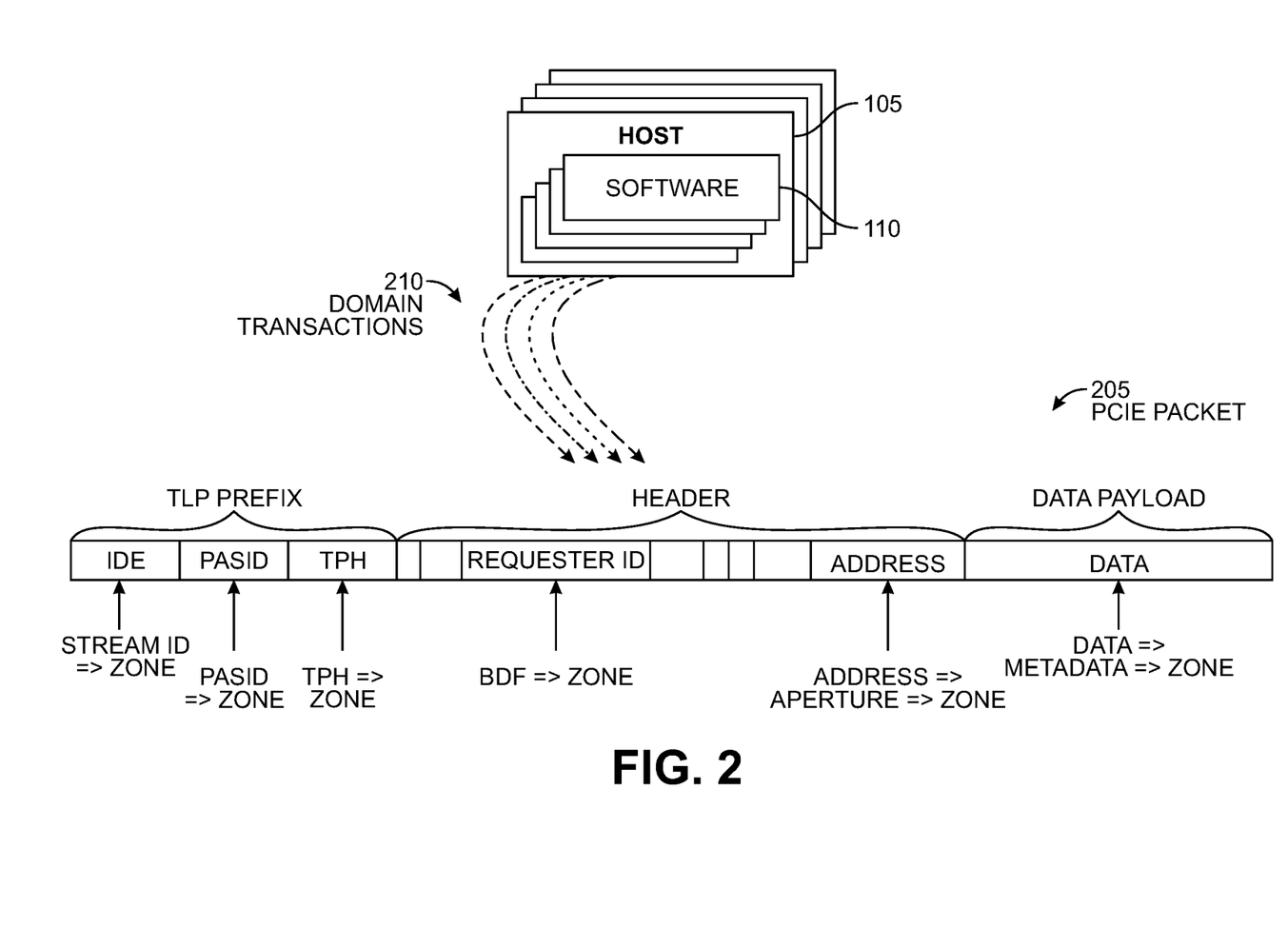
FIG. 2 illustrates zone binding property types in a PCIe packet, according to examples.

FIG. 2 illustrates zone binding property types in a PCIe packet, according to examples. Specifically, FIG. 2 illustrates a PCIe packet 205 of one of a domain transaction 210 that may be received from an external agent bound to one of the four zones illustrated in FIG. 1. For example, the external agents may be four of the hosts 105, four VMs/OSs, four user/tenant applications, four PCIe peer devices or accelerators, etc. These external agents can initiate the domain transactions 210 which are then received at an I/O gateway of a SoC (e.g., the I/O gateway 120 of the SoC 115 in FIG. 1).

The PCIe packet 205 includes a TLP prefix, header, and data payload. As discussed above, the PCIe packet 205 can include binding attributes for binding the packet 205 to a particular zone in the SoC. In one embodiment, the IDE field in the TLP prefix may contain attributes for a Link IDE Stream to create the binding—i.e., to identify which of the four domains the PCIe packet 205 (and the external agent that generated the packet 205) belong. In another embodiment, a PASID field in the TLP prefix can be used to bind the packet 205 to one of the four zones in the SoC. For example, the PASID field can indicate the destination function for a domain where different PASID values identify different domains or different functions for the same domain. In another embodiment, a TPH field in the TLP prefix can be used to create the binding. When the TPH is used for binding, there may be a restriction such that only unique TPH values can be sourced, and aliasing is not permitted, even though different sources (i.e., different external agents) have the full TPH namespace available to them. In that case, the TPH is uniquely provisioned across the four external agents such that the same TPH value cannot be issued by more than one external agent.

Instead of using a field in the TLP prefix as the binding, the Requester ID field in the header can be used. The Requester ID field can include a BDF value that indicates to the I/O gateway which zone the packet 205 should be bound to. In another embodiment, the address field in the header is used to create the binding. The address field can include a destination PCIe BAR for a function, and then the programmed aperture within the memory space of that PCIe BAR where the source address matches <Function #, PCIe BAR #, Aperture> or <BDF, PCIe BAR #, Aperture>.

Further, in one embodiment, the data in the data payload of the packet 205 can include a binding attribute used to create the binding. For example, the data payload can include metadata which indicates the zone corresponding to the packet 205.

A deeper explanation of the various embodiments for binding a domain transaction 210 received from an external actor using the various parts of the PCIe packet 205 illustrated in FIG. 2 were provided above, and thus, will not be repeated here.

Figure 3:
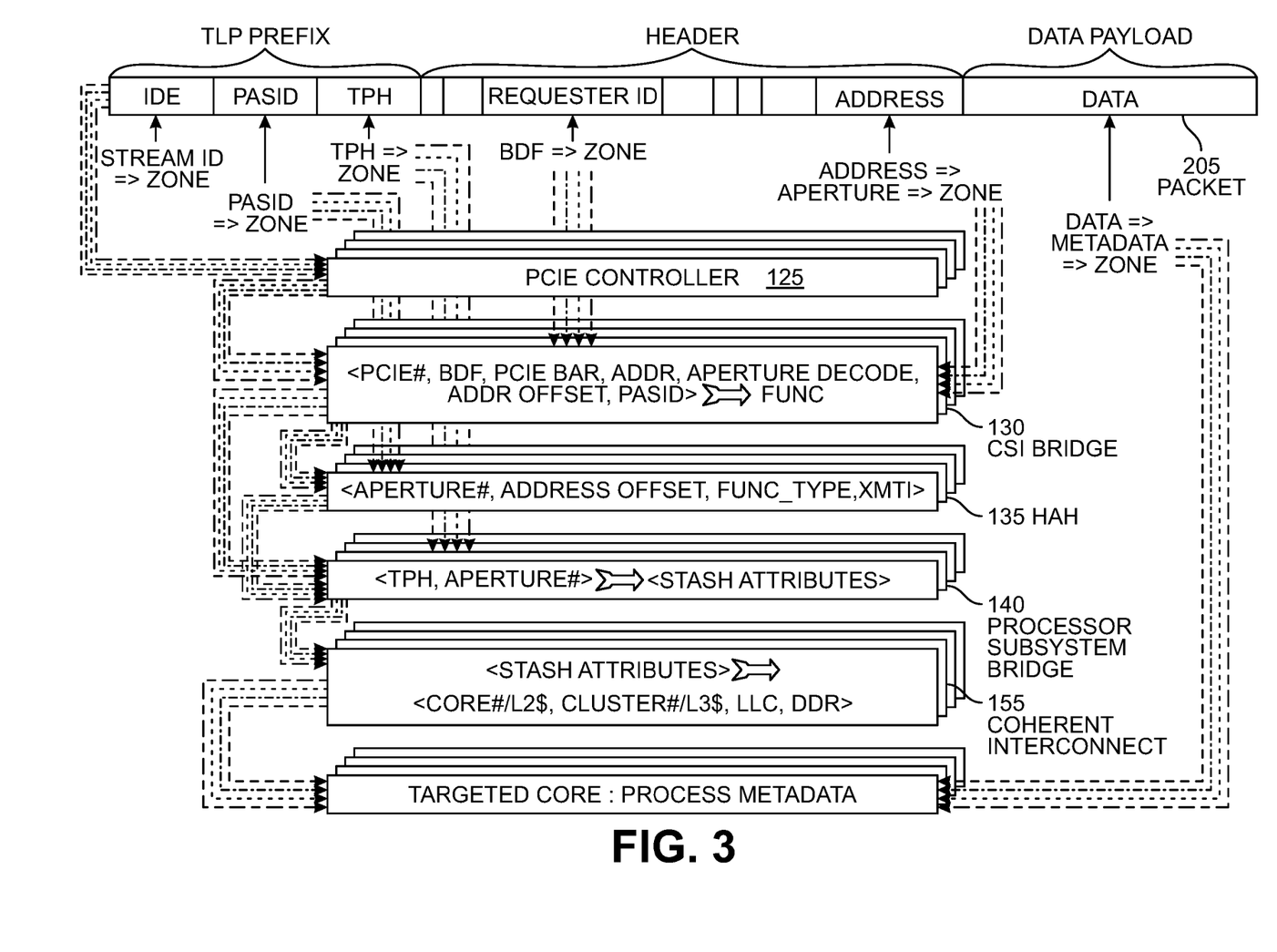
FIG. 3 illustrates transactions flows and associated binding attributes, according to an example.

FIG. 3 illustrates transactions flows and associated binding attributes, according to an example, That is, unlike FIG. 2 which illustrates the flow of the domain transactions from an external agent to the SoC, FIG. 3 illustrates the flow of the domain transactions once in the SoC (e.g., the SoC 115 in FIG. 1). That is, FIG. 3 illustrates the different conversions and manipulations performed at the various components in the SoC (e.g., the CSI bridge 130, HAH 135, processor subsystem bridge 140, and the coherent interconnect 155) in order to create an end-to-end binding of an external actor to a zone that extends across the SoC. In this manner, rather than these components acting as separate monolithic components, the components are bound together to create multiple zones.

The packet 205 is received at the PCIe controller 125. As shown, the PCIe controller 125 is logically divided into the four zones. This can be done using a single PCIe controller 125 that is shared by the four zones, or there can be separate physical controllers 125 for each zone. In one embodiment, the PCIe controller decrypts the packet 205. That is, the packets 205 for the four domain transactions can be encrypted such that the packets 205 for one domain cannot be read by external agents not in the same domain. However, in other embodiments, the data may remain encrypted within the SoC.

The PCIe controller 125 forwards the packet 205 to the CSI bridge 130, which again can be logically or physically assigned to the four zones in the SoC. In one embodiment, the CSI bridge 130 first extracts the source property for binding with a domain. That is, the CSI bridge 130 identifies the source of the PCIe packet 205 and binds the packet 205 to the domain corresponding to that source. For example, the CSI bridge 130 may be configured at boot to recognize which external agent (e.g., source) is bound to which domain. Thus, when the CSI bridge 130 receives a packet from that external agent, it can identify the domain to bind to the packet 205. The CSI bridge 130 can use any of the information shown in FIG. 2 to identify the source and the domain for the received packet 205.

After extracting the source property of the domain, the CSI bridge 130 extracts a destination property for binding with a zone in the SoC. Based on an address of the requesting TLP in the Header portion of the received PCIe packet 205, the CSI Bridge 130 can determine the destination function for that zone. The destination function can be identified by the CSI bridge 130 using many different attributes such as the PCIe controller number (PCIe #), BDF, PCIe BAR, the full address (Addy), address offset (Addr Offset), and the PASID.

Optionally, the binding attributes can be further evaluated by the HAH 135. The HAH 135 can receive the aperture number (aperture #), address offset, function type of the destination function, or other binding properties from the CSI bridge 130 in original or encoded form, or some relevant subset of the binding properties, along with the PCIe packet 205. The HAH 135 can then use additional PCIe packet attributes, and along with the attributes propagated by the CSI bridge 135, to further extract domain specific properties based on pre-configured bindings in the HAH 135 to subsequently identify the zone, if the specific zone or function within the zone has not already been identified by earlier steps.

The processor subsystem bridge 140 can receive the transactions from the HAH 135 or directly from the CSI bridge 130 and can add routing and stashing attributes to the transactions before propagating the transaction to the processor subsystem 145. As shown, the processor subsystem bridge 140 can use the information in the TPH field of the packet 205 or the aperture # to identify the stash attributes using a programmable table.

The coherent interconnect 155 receives the transactions from the processor subsystem bridge 140 and uses the stash attribute to forward the transactions to the cores, L2 or L3 caches in the cores, or memory controllers for storage in main memory.

While the transactions traverse the PCIe controller 125, the CSI bridge 130, HAH 135, the processor subsystem bridge 140, and the coherent interconnect 155, these hardware components create an end-to-end binding for transactions in each of the zones to provide dedicated hardware resources to each of the zones. That is, the circuitry in the PCIe controller 125, the CSI bridge 130, HAH 135, the processor subsystem bridge 140 can be logically and/or physically divided between the four zones so that the transactions for one zone cannot use resources assigned to a different zone. By creating these bindings in the hardware, this advantageously avoids the overhead associated with software defined zones in the SoC.

Figure 4:
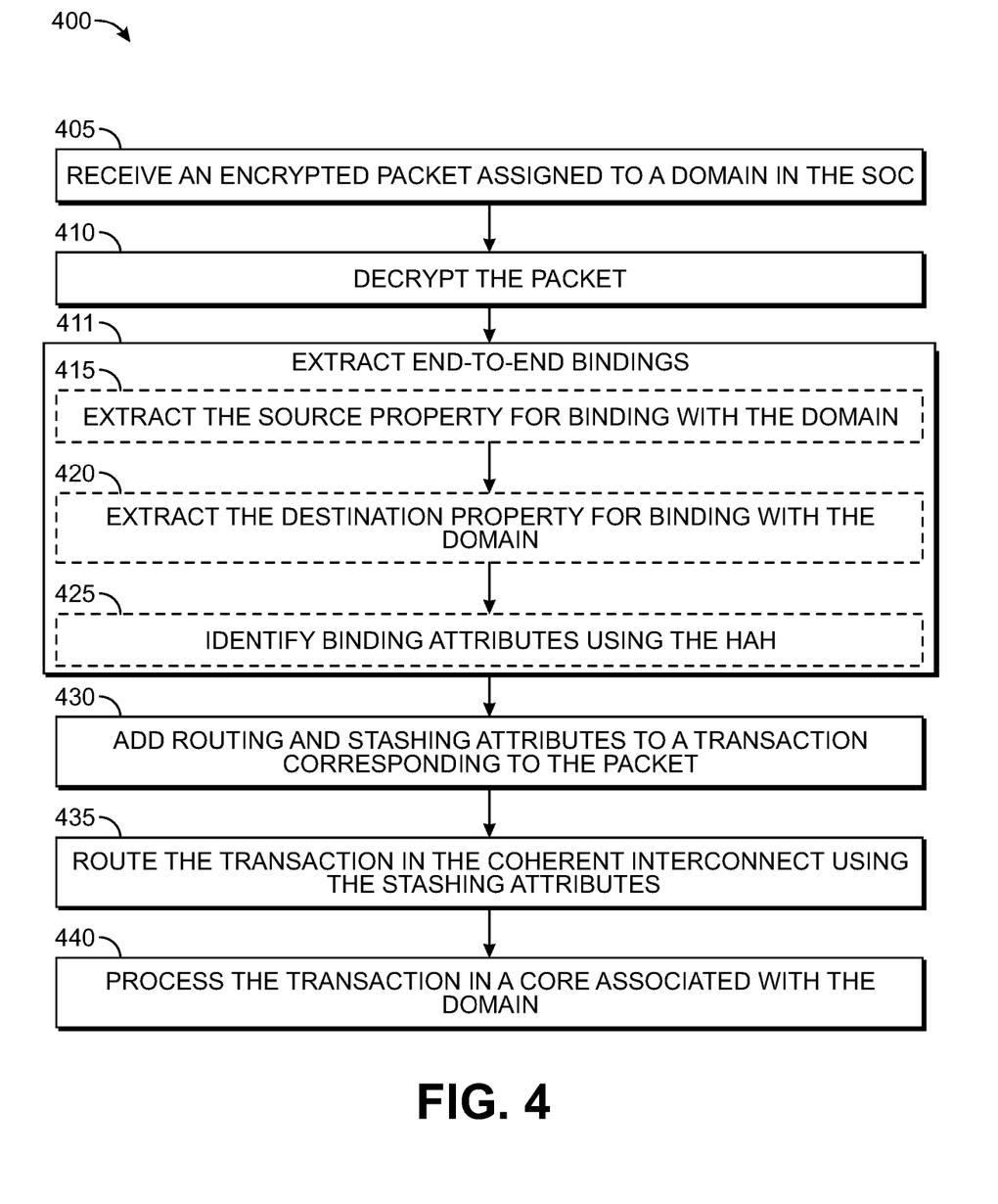
FIG. 4 illustrates a flowchart for transmitting transactions through a SoC with end-to-end bindings, according to one embodiment.

FIG. 4 illustrates a flowchart of a method 400 for transmitting transactions through a SoC with end-to-end bindings, according to one embodiment. At block 405, the SoC receives an encrypted packet assigned to a zone in the SoC from an external agent. That is, the SoC is previously configured to establish multiple zones that each has end-to-end bindings from an external agent through different components in the SoC (e.g., I/O gateway, coherent interconnect, cores, processor subsystem, PL fabric, etc.). In one embodiment, these bindings are controlled using hardware in the SoC (e.g., without relying on a hypervisor or OS in the SoC to maintain the domains).

The SoC can receive the packet (e.g., a PCIe packet) from different types of external agents. Stated differently, different types of external agents can be bound to the zones established in the SoC. Examples of the external agents can include (i) server hosts, (ii) VMs or OSs in a host, (iii) user/tenant applications executing in a host 105, or (iv) PCI peer devices or four peer accelerators (not shown). In one embodiment, the packets are received at an I/O gateway in the SoC.

At block 410, the SoC decrypts the packet. In one embodiment, a PCIe controller in the I/O gateway (e.g., the PCIe controller 125 in FIG. 1) decrypts the packet. The discussion above describes three examples or options for binding PCIe traffic streams to the different zones established in the SoC. In brief, these options include (i) preventing any of the domains from having access to the keys and properties for PCIe IDE traffic, (ii) having a binding between Selective IDE Streams and domains such that access to the keys and properties for PCIe IDE encrypted traffic is constrained to the Selective IDE Streams with binding for those domains, and/or (iii) forming a binding between the domains and the Requester ID attributes in the transactions such that access to the keys and properties for PCIe IDE encrypted traffic is constrained not only to the Selective IDE Streams with binding for a particular domain, but also to a particular BDF value or set of BDF values, or a set of function numbers.

At block 411, circuitry in the I/O gateway extracts the end-to-end bindings. This extraction can be performed by the CSI bridge, the HAH, the processor subsystem bridge, and combinations thereof which are all circuitry within the I/O gateway.

Optionally, at block 415, the SoC extracts the source property for binding with the domain. In one embodiment, a CSI bridge (e.g., the CSI bridge 130 in FIG. 1) identifies the source of the PCI packets and binds the data received from that source to its corresponding domain. In the situation where the transactions for the domains in the SoC are received at multiple PCIe controllers, the CSI_ID is one such source property, communicating the PCIe controller connection. This includes the case where the transactions are received from four hosts, and the case where the transactions are received from four distinct PCIe Peer/Accelerator Sources, Thus, the CSI_ID or a PCIe controller number is one criterion for extracting the source property binding with a domain: <PCIe Controller #>.

Alternatively, where the transactions for the domains in the SoC are received at a single PCIe controller, the transactions can represent distinct Requester ID (BDF) sources, function numbers, or Requester ID Groups (e.g. PFs plus their associated VFs) for extracting the source property binding with a domain: <BDF>. A unique combination of <PCIe Controller #, BDF> can also form the criteria for extracting the source property binding assigned to a domain.

Optionally, at block 420, the SoC extracts the destination property for binding with the zone in the SoC. In one embodiment, the CSI bridge binds the destination of the PCIe packet to the same domain as the source. Based on an address of the requesting TLP in the header portion of the received PCIe packet, the CSI Bridge can determine the destination function for that zone, based on the destination PCIe BAR for that function, and then the programmed aperture within the memory space of that PCIe BAR where the source address matches <Function #, PCIe BAR #, Aperture> or <BDF, PCIe BAR #, Aperture>.

The destination function for a zone can also be based on a source address offset match with address offsets within the aperture associated with certain functions. A unique combination of <PCIe Controller #, BDF, PCIe BAR, Aperture, Offset> can also form the criteria for extracting the source property binding with a zone along with different offsets identifying different zones or different functions for the same zone.

In addition to using the PCIe BAR and/or the source address offset match, a PASID in the TLP prefix of a received PCIe packet can determine the destination function for a zone where different PASID values identify different zones or different functions for the same zone.

Optionally, at block 425, a HAH (e.g, the HAH 135 in FIG. 1) identifies binding attributes. That is, in one embodiment, the binding attributes can be further discerned by the HAH 135. The HAH 135 can receive binding properties from the CSI bridge in original or encoded form, or some relevant subset of the binding properties, along with the PCIe packet. For example, if the Address Offset was not a binding property for the CSI Bridge, but is a binding property for the HAH, then the CSI bridge propagates the set of attributes to the HAH which the HAH uses for further binding to a specific zone. The HAH can then use additional PCIe packet attributes, and along with the attributes propagated by the CSI bridge, to further extract domain specific properties based on pre-configured bindings in the HAH to subsequently identify the zone, if the specific zone or function within the zone has not already been identified by earlier steps.

At block 430, the SoC adds routing and stashing attributes to a transaction corresponding to the packet based on the end-to-end bindings. In one embodiment, the routing and stashing attributes are added by a processor subsystem bridge (e.g., the processor subsystem bridge 140 in FIG. 1) in the I/O gateway. In one embodiment, the stashing attributes are identified by extracting the bindings at blocks 415, 420, and/or 425 using the CSI bridge or the HAH as discussed above. However, in another embodiment, the stashing attributes can instead be directly identified without using the CSI bridge and the HAH. For example, FIG. 3 illustrates that when the TPH is used to provide the bindings, the processor subsystem bridge 140 can determine the stash attributes directly using the TPH field in the PCIe packet 205, without the CSI bridge and the HAH having to extract the bindings and identify the domain/zone corresponding to the transaction. In this scenario, the blocks 415, 425, and 425 can be omitted from the method 400.

Thus, the method 400 illustrates the circuitry in the I/O gateway (whether that circuitry is the CSI bridge, HAH, processor subsystem bridge or some combination thereof) is used to extract the end-to-end bindings using data in a received PCIe packet.

In one embodiment, the processor subsystem bridge uses the TPH to reference a programmable lookup table or indexed table to acquire further domain binding attributes to include with transactions that are routed from I/O gateway to a coherent interconnect in the processor subsystem (e.g., the coherent interconnect 155 in the processor subsystem 145 in FIG. 1). The lookup table can be programmed such that each TPH value can indicate a particular set of cache injection (e.g., stashing) attributes, such as a StashNID and StashLPID, which can uniquely identify the stash destination within the processor subsystem. Transactions to certain processor subsystem destined apertures may not be enabled to have stashing attributes and command types, or alternatively, certain TPH values may have lookup results where the stashing attributes indicate no stash attributes need to be added before forwarding to the processor subsystem.

At block 435, the interconnect in the processor subsystem routes the transaction using the stashing attributes. In one embodiment, after passing through the IOMMU in the interconnect, the interconnect routes the transaction to one of the processor core zones. This can include routing the transaction to a particular L2 cache in one of the cores in the corresponding core zone, or to the L3 cache for the corresponding core zone.

At block 440, the corresponding core zone processes the transaction. This can include performing an operation on data in the transaction using a processing core (e.g., one of the cores 150 in FIG. 1) or storing the data in a L2 or L3 cache. Further, the interconnect may route the transaction outside the processor subsystem such as a NoC, memory controller, or programmable fabric.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. in this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system on a chip (SoC), comprising:
   an I/O gateway configured to couple to an external host; and
   a processor subsystem connected to the I/O gateway, comprising:
   processing cores; and
   an interconnect communicatively coupling the processing cores,
   wherein circuitry in the I/O gateway, the processing cores, and the interconnect is divided into a plurality of zones with end-to-end bindings so that each of the plurality of zones is isolated from each other, wherein the circuitry in the I/O gateway is configured to extract the end-to-end bindings, wherein the end-to-end bindings between the I/O gateway, the interconnect, and the processing cores are controlled by hardware in the SOC without use of a hypervisor or operating system.

2. The SoC of claim 1, wherein a first cluster of the processing cores is assigned to a first zone of the plurality of zones and a second cluster of the processing cores is assigned to a second zone of the plurality of zones.

3. The SoC of claim 1, further comprising:
   memory controllers, where each of the memory controllers is assigned to one of the plurality of zones; and
   a network on a chip (NoC) configured communicatively coupling the memory controllers to the interconnect.

4. The SoC of claim 1, wherein the I/O gateway is configured to:
   decrypt a packet received from the external host;
   extract a source property for binding the packet to one of the plurality of zones;
   extract a destination property for binding the packet to one of the plurality of zones; and
   add routing and stashing attributes to a transaction corresponding to the packet.

5. The SoC of claim 4, wherein the interconnect is configured to route the transaction using the stashing attributes to one of the processing cores.

6. The SoC of claim 5, wherein extracting the end-to-end bindings is performed by at least one of a composable scalable interconnect (CSI) bridge, host access handler (HAH), or processor subsystem bridge in the I/O gateway.

7. A smart network interface controller (SmartNIC), comprising:
   an I/O gateway configured to couple to external hosts, virtual machines, operating systems, user/tenant applications, or peer devices; and a processor subsystem connected to the I/O gateway, comprising:
processing cores; and
an interconnect communicatively coupling the processing cores, wherein circuitry in the I/O gateway, the processing cores, and the interconnect is divided into a plurality of zones with end-to-end bindings so that each of the plurality of zones is isolated from each other, wherein the circuitry in the I/O gateway is configured to extract the end-to-end bindings, and wherein the I/O gateway is configured to:
decrypt a packet received from an external host;
extract a source property for binding the packet to one of the plurality of zones;
extract a destination property for binding the packet to one of the plurality of; and
add routing and stashing attributes to a transaction corresponding to the packet.

8. The SmartNIC of claim 7, wherein a first cluster of the processing cores is assigned to a first zone of the plurality of zones and a second cluster of the processing cores is assigned to a second domain of the plurality of zones.

9. The SmartNIC of claim 7, further comprising:
memory controllers, where each of the memory controllers is assigned to one of the plurality of zones; and
a network on a chip (NoC) configured communicatively coupling the memory controllers to the interconnect.

10. The SmartNIC of claim 7, wherein the I/O gateway is configured to:
decrypt a packet received from the external host;
extract a source property for binding the packet to one of the plurality of zones;
extract a destination property for binding the packet to one of the plurality of zones; and
add routing and stashing attributes to a transaction corresponding to the packet.

11. The SmartNIC of claim 7, wherein the interconnect is configured to route the transaction using the stashing attributes to one of the processing cores.

12. The SmartNIC of claim 11, wherein extracting the end-to-end bindings is performed by at least one of a composable scalable interconnect (CSI) bridge, host access handler (HAH), or processor subsystem bridge in the I/O gateway.

13. The SmartNIC of claim 7, wherein the end-to-end bindings between the I/O gateway, the interconnect, and the processing cores are executed without using a hypervisor or operating system.

14. A method, comprising:
receiving, at a SoC, an encrypted packet assigned to a first zone of a plurality of zones in the SoC;
decrypting the encrypted packet;
extracting, at an I/O gateway in the SoC, end-to-end bindings from the decrypted packet;
adding, at the I/O gateway, stashing attributes to a transaction corresponding to the decrypted packet based on the end-to-end bindings;
routing, in an interconnect in the SoC, the transaction based on the stashing attributes to a first processing core in the SoC assigned to the first zone; and
processing the transaction at the first processing core.

15. The method of claim 14, circuitry in the I/O gateway, the interconnect, a plurality of processing cores in the SoC is divided into a plurality zones with the end-to-end bindings so that each of the plurality of zones is isolated from each other.

16. The method of claim 15, wherein a first cluster of the plurality of processing cores is assigned to a first zone of the plurality of zones and a second cluster of the plurality of processing cores is assigned to a second zone of the plurality of zones.

17. The method of claim 15, wherein the end-to-end bindings between the I/O gateway, the interconnect, and the processing cores are executed without using a hypervisor or operating system.

18. The method of claim 14, wherein the stashing attributes indicate a L2 cache in the first processing core as a target of the transaction.

19. The method of claim 14, further comprising:
identifying binding attributes based on the decrypted packet using a host access handler (HAH) in the I/O gateway.

20. A system on a chip (SoC), comprising:
an I/O gateway configured to couple to an external host; and
a processor subsystem connected to the I/O gateway, comprising:
processing cores; and
an interconnect communicatively coupling the processing cores,
wherein circuitry in the I/O gateway, the processing cores, and the interconnect is divided into a plurality of zones with end-to-end bindings so that each of the plurality of zones is isolated from each other, wherein the circuitry in the I/O gateway is configured to extract the end-to-end bindings; wherein the I/O gateway is configured to:
decrypt a packet received from the external host;
extract a source property for binding the packet to one of the plurality of zones;
extract a destination property for binding the packet to one of the plurality of zones; and
add routing and stashing attributes to a transaction corresponding to the packet.

21. The SoC of claim 20, wherein the interconnect is configured to route the transaction using the stashing attributes to one of the processing cores.

22. The SoC of claim 21, wherein extracting the end-to-end bindings is performed by at least one of a composable scalable interconnect (CSI) bridge, host access handler (HAH), or processor subsystem bridge in the I/O gateway.

* * * * *